United States Patent
Liu et al.

(10) Patent No.: US 9,845,818 B2
(45) Date of Patent: Dec. 19, 2017

(54) COUPLING DEVICE AND LAMP APPARATUS HAVING THE SAME

(71) Applicant: Radiant Opto-Electronics Corporation, Kaohsiung (TW)

(72) Inventors: Shang-Chia Liu, Kaohsiung (TW); Guo-Hao Huang, Kaohsiung (TW); Kun-Feng Chen, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 147 days.

(21) Appl. No.: 14/968,821

(22) Filed: Dec. 14, 2015

(65) Prior Publication Data

US 2016/0177990 A1  Jun. 23, 2016

(30) Foreign Application Priority Data

Dec. 18, 2014 (TW) .............................. 103144328 A

(51) Int. Cl.
  *F16B 7/04* (2006.01)
  *F21V 17/10* (2006.01)
(52) U.S. Cl.
  CPC ............ *F16B 7/0413* (2013.01); *F21V 17/10* (2013.01)
(58) Field of Classification Search
  CPC ........ F16B 7/0413; F21V 17/10; F21V 21/14; F21V 21/34
  See application file for complete search history.

(56) References Cited

U.S. PATENT DOCUMENTS

| 3,673,402 | A | * | 6/1972 | Weiss | .................... F21V 17/007 |
| | | | | | 174/69 |
| 8,109,647 | B2 | * | 2/2012 | Soo | .......................... F21S 8/02 |
| | | | | | 362/217.02 |
| 8,794,795 | B2 | * | 8/2014 | Yaphe | ................... F21V 15/012 |
| | | | | | 362/217.01 |

FOREIGN PATENT DOCUMENTS

| CN | 1150613 | A | 5/1997 |
| CN | 201589227 | U | 9/2010 |
| CN | 101992658 | A | 7/2013 |
| CN | 103842713 | A | 6/2014 |
| EP | 0603855 | A1 | 6/1994 |
| JP | 2007-200822 | A | 8/2007 |
| KR | 10-2013-0130954 | A | 12/2013 |
| TW | 288486 | U | 10/1996 |
| TW | 329900 | U | 4/1998 |
| TW | M349464 | U1 | 1/2009 |
| TW | M387209 | U1 | 8/2010 |

(Continued)

OTHER PUBLICATIONS

Search Report dated Mar. 13, 2017 for Chinese patent application No. 2015101245195 with English translation.

(Continued)

*Primary Examiner* — Thomas M Sember
(74) *Attorney, Agent, or Firm* — Ladas & Parry, LLP

(57) ABSTRACT

A coupling device includes a plurality of frames, each of which includes a base wall, and two spaced-apart side walls that cooperate with the base wall to define an accommodation space. The frames are arranged such that the accommodation spaces of the frames communicate with each other. At least one coupling unit is disposed in the accommodation spaces of two adjacent ones of the frames and applies a force to the side walls of the two adjacent ones of the frames so as to couple together the two adjacent ones of the frames.

14 Claims, 8 Drawing Sheets

(56) References Cited

FOREIGN PATENT DOCUMENTS

TW          M467015 U      12/2013

OTHER PUBLICATIONS

Office Action dated Mar. 29, 2017 for Chinese patent application No. 2015101245195 with English translation.
Search Report dated Mar. 25, 2016 for Taiwanese patent application No. 103144328 with english translation.
Search Report dated Oct. 11, 2016 for Taiwanese patent application No. 103144328 with english translation.

* cited by examiner

COUPLING DEVICE AND LAMP APPARATUS HAVING THE SAME

CROSS-REFERENCE TO RELATED APPLICATION

This application claims priority of Taiwanese Application No. 103144328, filed on Dec. 18, 2014.

FIELD

The disclosure relates to a coupling device, and more particularly to a lamp apparatus and a coupling device therefor.

BACKGROUND

As shown in FIG. 1, a conventional lamp apparatus includes two substantially inverted truncated V-shaped frames 11 (only one is shown) connected horizontally to each other and cooperatively defining a mounting space 110, a lamp holder 12 mounted in the mounting space 110, a clamping member 13 clamped outside one of the frames 11, and a screw 14 penetrating the clamping member 13 and having an end abutting against one of the frames 11. Each of the frames 11 includes a base wall 111, and two clamping grooves 112 that are respectively formed in opposite sides of the base wall 111 and that open outward. The clamping member 13 includes a flat portion 131 extending horizontally, a screw hole 132 formed in the flat portion 131, and two clamping portions 133 extending respectively and obliquely from opposite ends of the flat portion 131 and respectively have ends 134 that are bent inward to form hooks. The ends 134 of the clamping portions 133 respectively engage the clamping grooves 112 in the frames 11.

Since the clamping member 13 clamps to the clamping grooves 112 of the frames 11 through the ends 134 of the clamping portion 133 merely, the ends 134 of the clamping portions 133 tend to come loose from constant deformation due to long-term or repeated use which may lead to falling of the frames 11 from the ceiling and cause accidents. In addition, because the clamping member 13 is disposed between the lamp holder 12 and the ceiling, adjustment and handling of the clamping member 13 by a user who is below the lamp holder 12 are complicated.

SUMMARY

Therefore, an object of the disclosure is to provide a coupling device that has a simple structure and that occupies a small space.

Another object of the disclosure is to provide a lamp apparatus that has the aforesaid coupling device.

According to an aspect of the disclosure, a coupling device includes a plurality of frames and at least one coupling unit. Each of the frames includes a base wall, and two spaced-apart side walls that cooperate with the base wall to define an accommodation space. The frames are arranged such that the accommodation spaces of the frames communicate with each other. The at least one coupling unit is disposed in the accommodation spaces of two adjacent ones of the frames and applies a force to the side walls of the two adjacent ones of the frames so as to couple together the two adjacent ones of the frames.

According to another aspect of the disclosure, a lamp apparatus includes a coupling device as described above and at least one light source disposed in the accommodation spaces of the frames.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
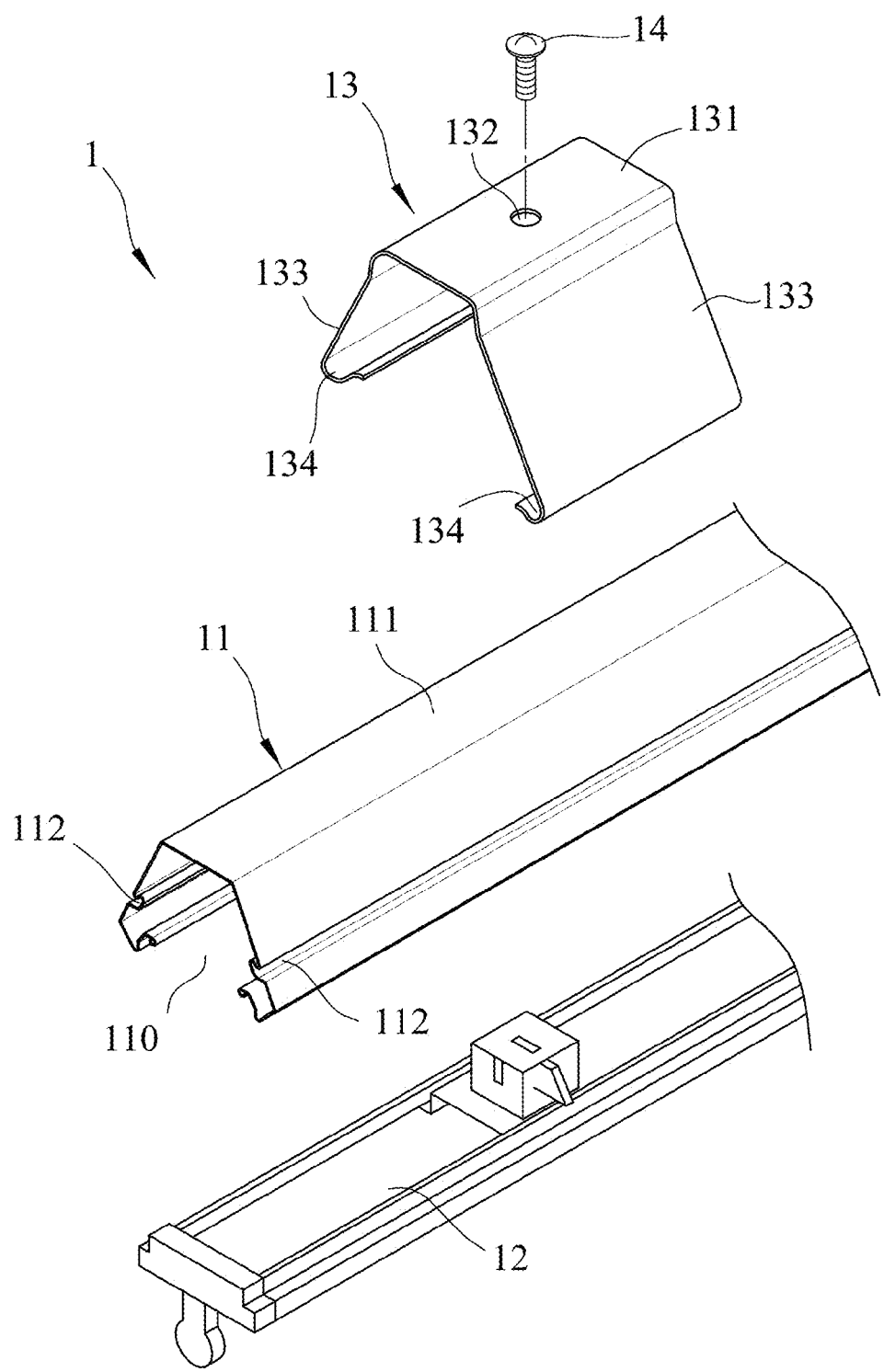
FIG. 1 is an exploded perspective view illustrating a conventional lamp apparatus.

Before the disclosure is described in greater detail, it should be noted that like elements are denoted by the same reference numerals throughout the disclosure.

Figure 2:
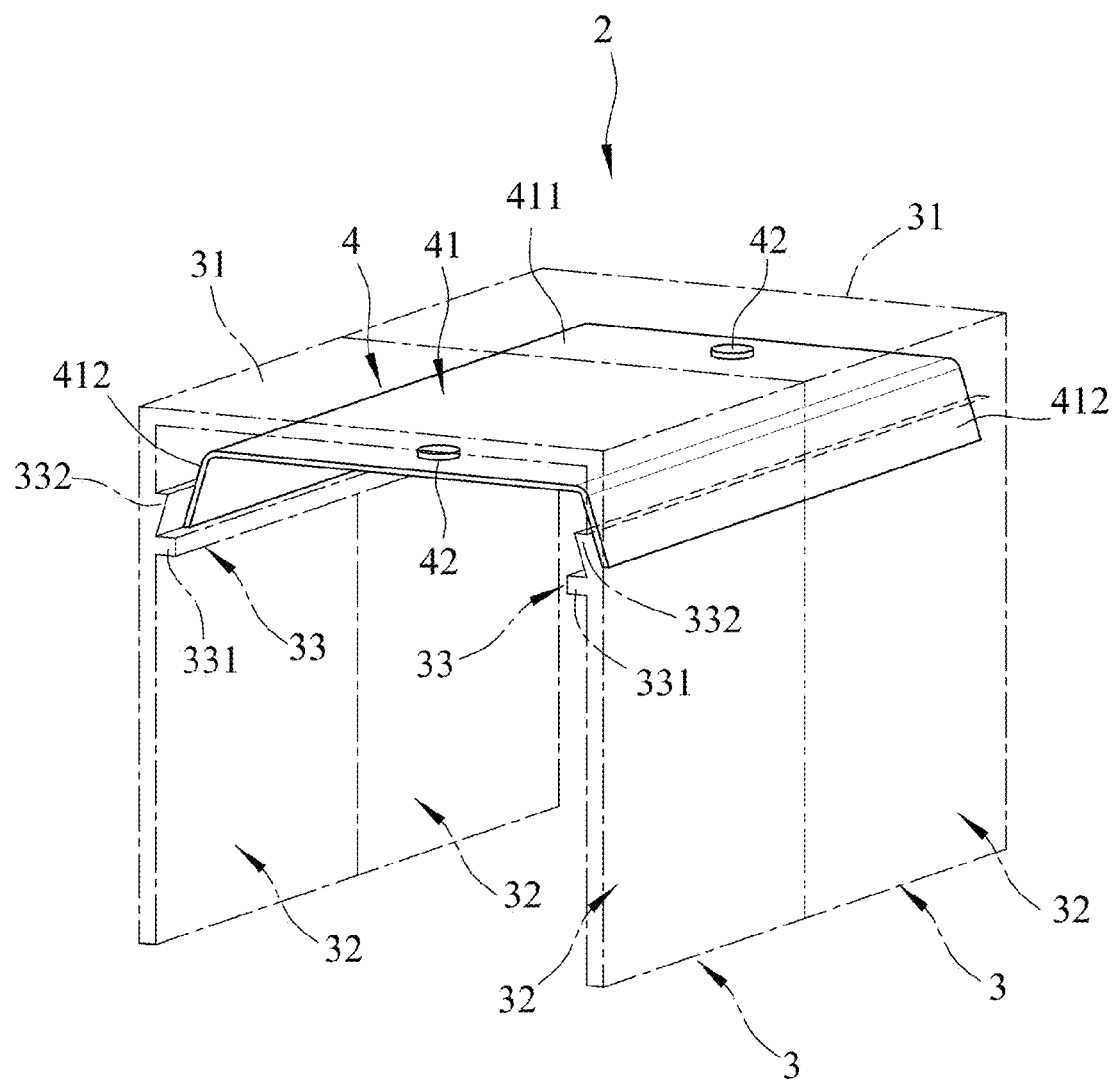
FIG. 2 is an assembled perspective view of a first embodiment of a coupling device according to the disclosure.
Figure 3:
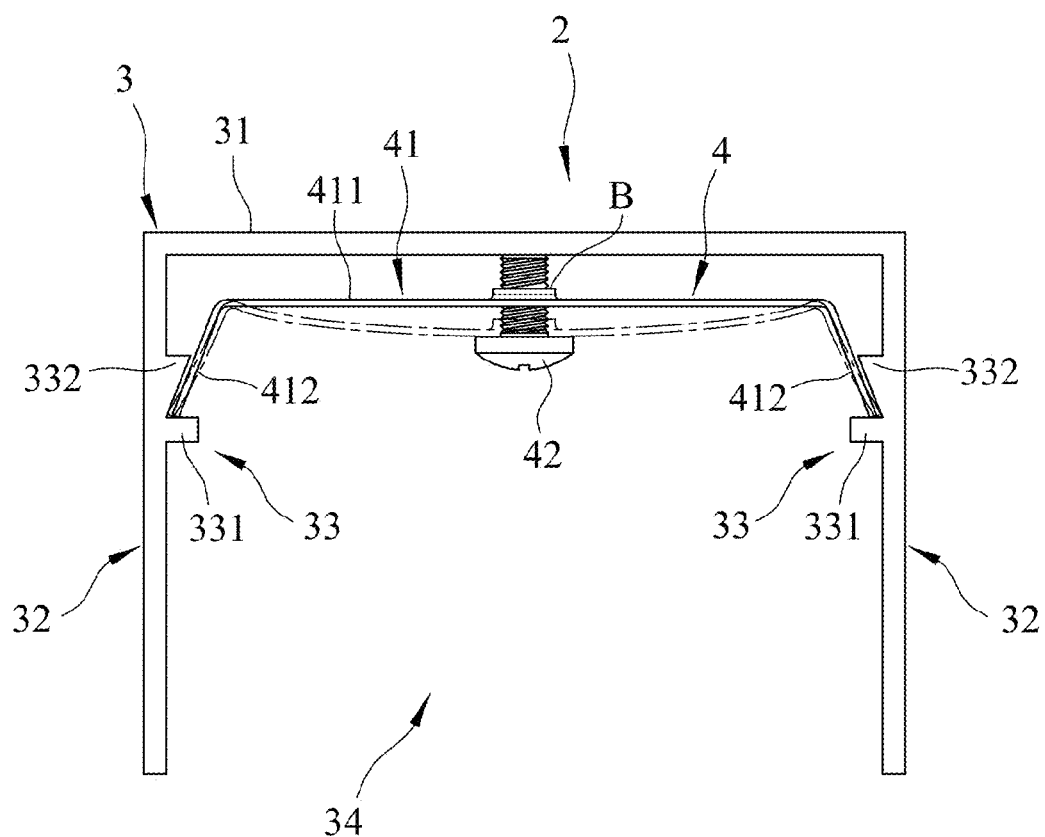
FIG. 3 is an assembled schematic side view of the first embodiment.

Referring to FIGS. 2 and 3, a first embodiment of a coupling device 2 according to the disclosure includes a plurality of frames 3 and a plurality of coupling units 4. Each of the coupling units 4 interconnects two adjacent ones of the frames 3. In order to facilitate the explanation, the following texts and drawings are based on two adjacent frames 3 and a coupling unit 4 coupling the frames 3.

Each of the frames 3 includes a base wall 31, two side walls 32 extending respectively and transversely from two opposite ends of the base wall 31 and cooperating with the base wall 31 to define an accommodation space 34, and two limiting portions 33 respectively provided on the side walls 32 within the accommodation space 34. The base wall 31 cooperates with the side walls 32 to form a substantially U-shaped structure surrounding the accommodation space 34. The frames 3 are arranged such that the base walls 31 are flush with one another, the sides walls 32 are also flush with one another, and the accommodation spaces 34 of the frames 3 communicate with each other. Each of the limiting portions 33 has a first fixed segment 331 disposed on and extending along a horizontal length of a corresponding one of the side walls 32, and a second fixed segment 332 disposed on and extending along the horizontal length of the corresponding side wall 32 and inclined to the first fixed segment 331. As shown in FIG. 3, the first and second fixed segments 331, 332 form an angle therebetween, preferably, the angle is a sharp angle.

Figure 4:
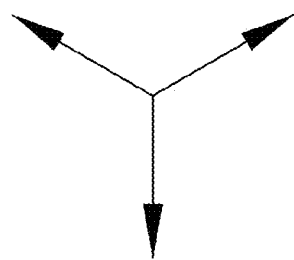
FIG. 4 is a diagram illustrating components of force of the first embodiment.

The coupling unit 4 includes a resilient member 41 disposed in the accommodation spaces 34 of the two adjacent frames 3, and two spaced-apart adjusting members 42. The resilient member 41 has a main body portion 411, and two engaging portions 412 extending obliquely and respectively from two opposite ends of the main body portion 411. Each of the engaging portions 412 abuts against the first and second fixed segments 331, 332 of a respective one of the limiting portions 33 of each frame 3. Specifically, each of the engaging portions 412 is received in the area formed between the first and second fixed segments 331, 332 of the respective limiting portion 33. In this embodiment, each of the adjusting members 42 is a screw, and the main body portion 411 is formed with two screw holes (B) (only one is shown in FIG. 3) for threaded engagement with the respective screw or adjusting member 42. Each of the adjusting members 42 passes through a respective one of the screw holes (B) in the main body portion 411 of the resilient member 41, and has an end abutting against the base wall 31 of the corresponding frame 3. When one of the adjusting members 42 is rotated, since the end of the adjusting member 42 abuts against the base wall 31 (see FIG. 3) and the adjusting member 42 is threadedly engaged to the main body portion 411 of the resilient member 41, the main body portion 411 of the resilient member 41 is caused to deform and a central part thereof moves away from the base wall 31, as shown in phantom lines in FIG. 3, and generates a force that is directed away from the base wall 31 and that drives the main body portion 411 to deform. The components of the force of the resilient member 41 are illustrated in FIG. 4. When the main body portion 411 deforms, the engaging portions 412 simultaneously apply outward forces to the side walls 32 of the two adjacent frames 3 so as to couple them together and achieve a goal of coupling effect. Thus, the resilient member 41 is deformed by rotating the adjusting member 42 and generates an outward force that pushes the engaging portions 412 to respectively abut against the limiting portions 33 of each frame bracket 3, thereby connecting the two adjacent frames 3 together. Rotation of the different adjusting members 42 can adjust the degree of deformation of the corresponding part of the main body portion 411 of the resilient member 41 so as to change the force acting on the corresponding frame 3 and the distance between the main body portion 411 and the corresponding frame 3.

Figure 5:
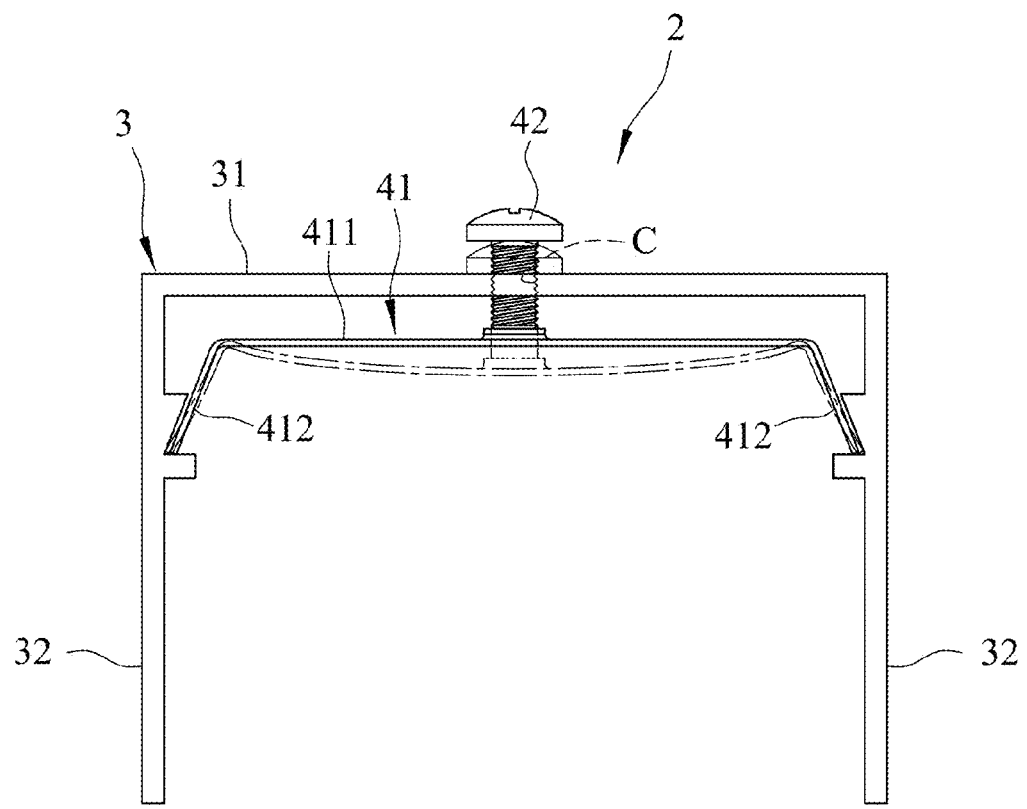
FIG. 5 is an assembled schematic side view of a second embodiment of a coupling device according to the disclosure.

Referring to FIG. 5, a second embodiment of the coupling device 2 according to the disclosure differs from the first embodiment in that the base wall 31 of each of the frames 3 is formed with a screw hole (C), and each screw or adjusting member 42 passes through the screw hole (C) in the base wall 31 of the respective frame 3, and has an end abutting against the main body portion 411 of the resilient member 41. When one of the adjusting members 42 is rotated, the adjusting member 42 moves relative to the base wall 31 of the respective frame 3 to push the main body portion 411 of the resilient member 41 away from the base wall 31, thereby deforming the main body portion 411. The components of the force of the resilient member 41 are shown in FIG. 4. In response to the deformation of the main body portion 411, the engaging portions 412 generate and apply outward forces to the side walls 32 of the frames 3 so as to couple them together. The second embodiment provides an alternate configuration for the coupling device 2 for increasing its versatility.

Figure 6:
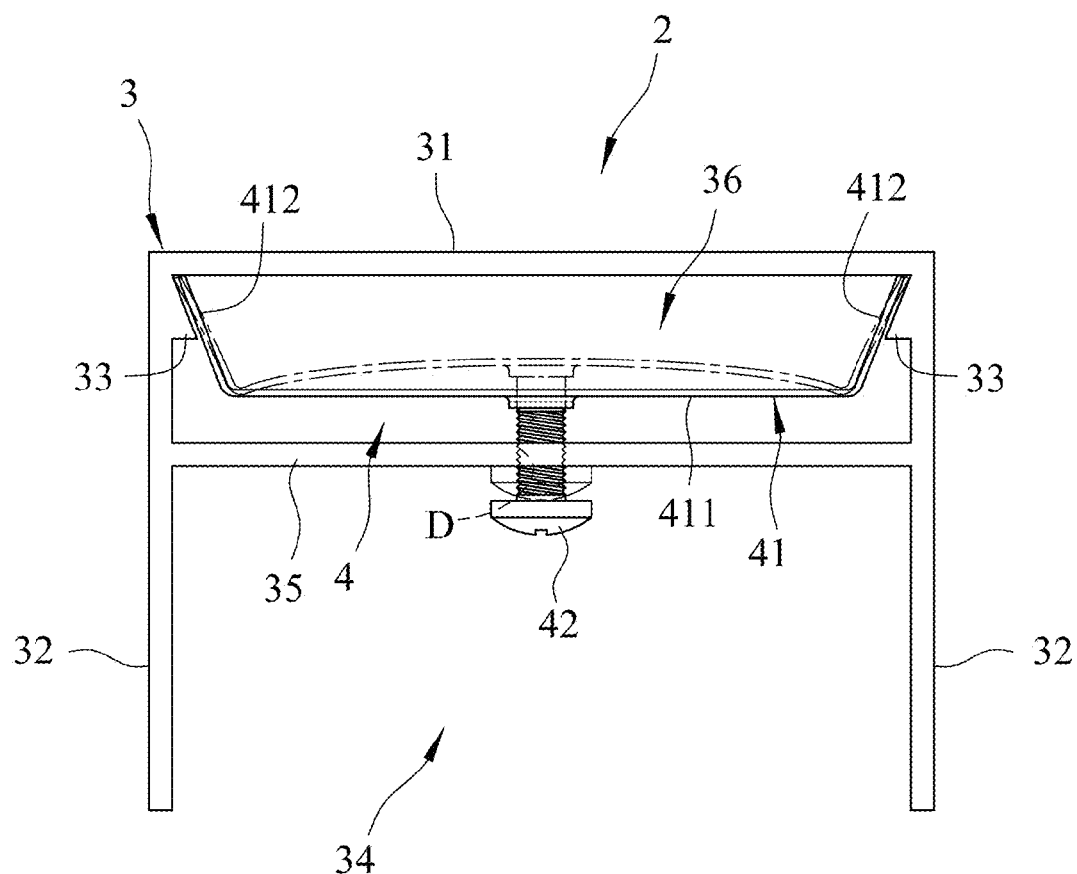
FIG. 6 is an assembled schematic side view of a third embodiment of a coupling device according to the disclosure.
Figure 7:
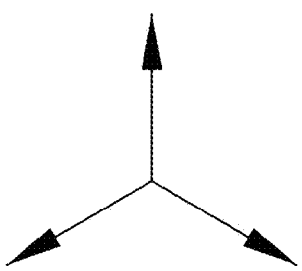
FIG. 7 is a diagram illustrating components of force of the third embodiment.

Referring to FIG. 6, a third embodiment of the coupling device 2 according to the disclosure differs from the first embodiment in that each of the frames 3 further includes a partition wall 35 that is disposed in the accommodation space 34, that is spaced apart from the base wall 31, and that interconnects the sides walls 32. The base wall 31, the partition wall 35 and the side walls 32 cooperate to define a region 36. The resilient member 41 of the coupling unit 4 is disposed in the regions 36 of the two adjacent ones of the frames 3. Each of the limiting portions 33 is formed obliquely in the region 36 to form an angle between the limiting portion 33 and the base wall 31, and abuts against a corresponding one of the engaging portions 412 of the resilient member 41. Each partition wall 35 is formed with a screw hole (D). Each screw or adjusting member penetrates through the screw hole (D) in the partition wall 35 of the respective frame 3, and has an end that abuts against the main body portion 411 of the resilient member 41. When one of the adjusting members 42 is rotated, the adjusting member 42 moves relative to the partition wall 35 to push and deform the main body portion 411 toward the base wall 31. The components of the force of the resilient member 41 are shown in FIG. 7. Thus, in response to the deformation of the main body portion 411, the engaging portions 412 generate and apply outward forces (see FIG. 7) to the limiting portions 33 of the frames 3 so as to couple them together. The third embodiment provides another alternate configuration for the coupling device 2 for increasing its versatility.

Figure 8:
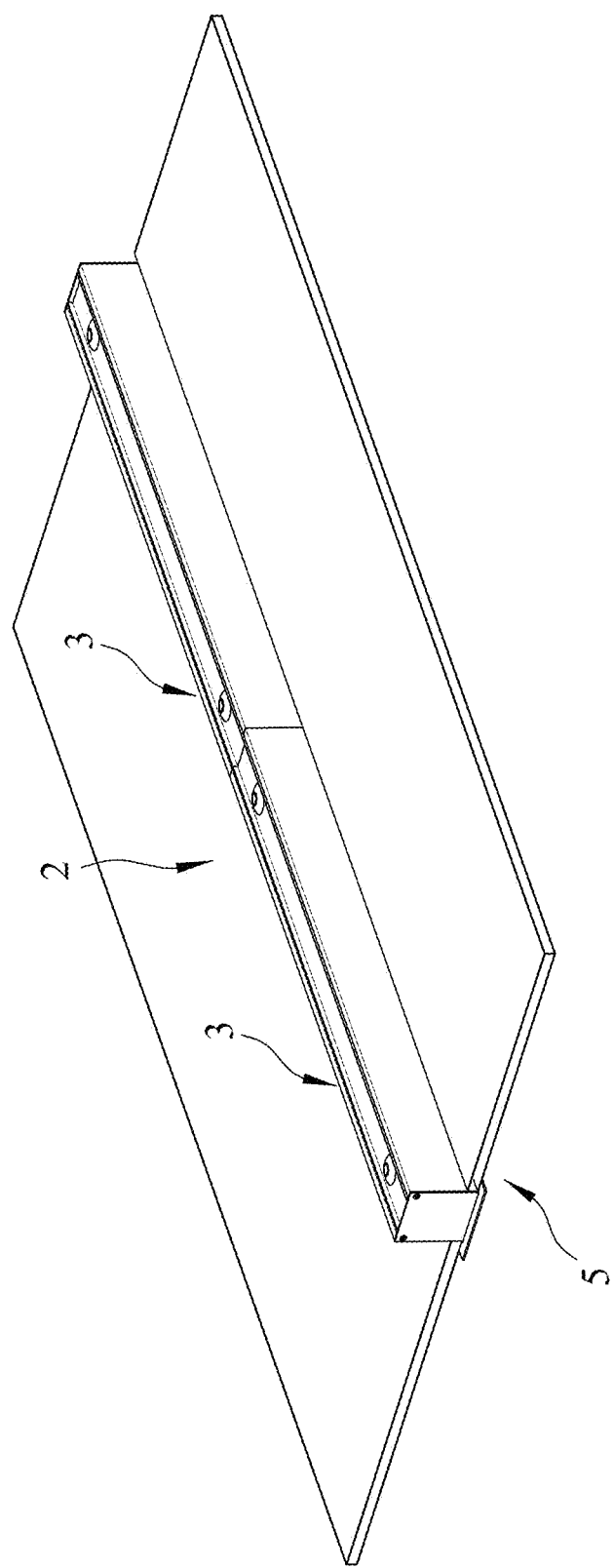
FIG. 8 is a perspective view of a lamp apparatus incorporating a fourth embodiment of a coupling device according to the disclosure.
Figure 9:
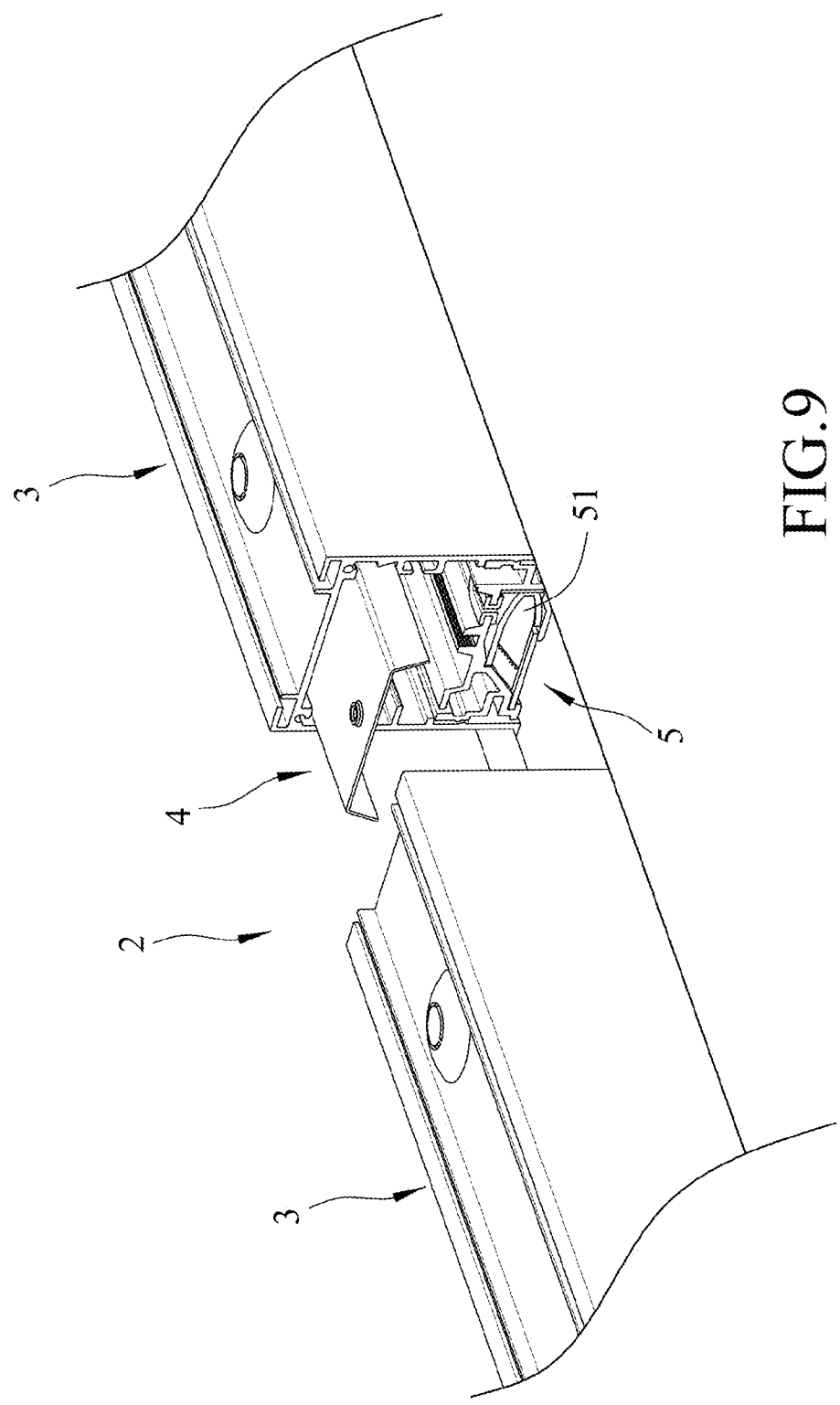
FIG. 9 is an enlarged fragmentary perspective view of FIG. 8, illustrating how frames of the fourth embodiment are assembled.
Figure 10:
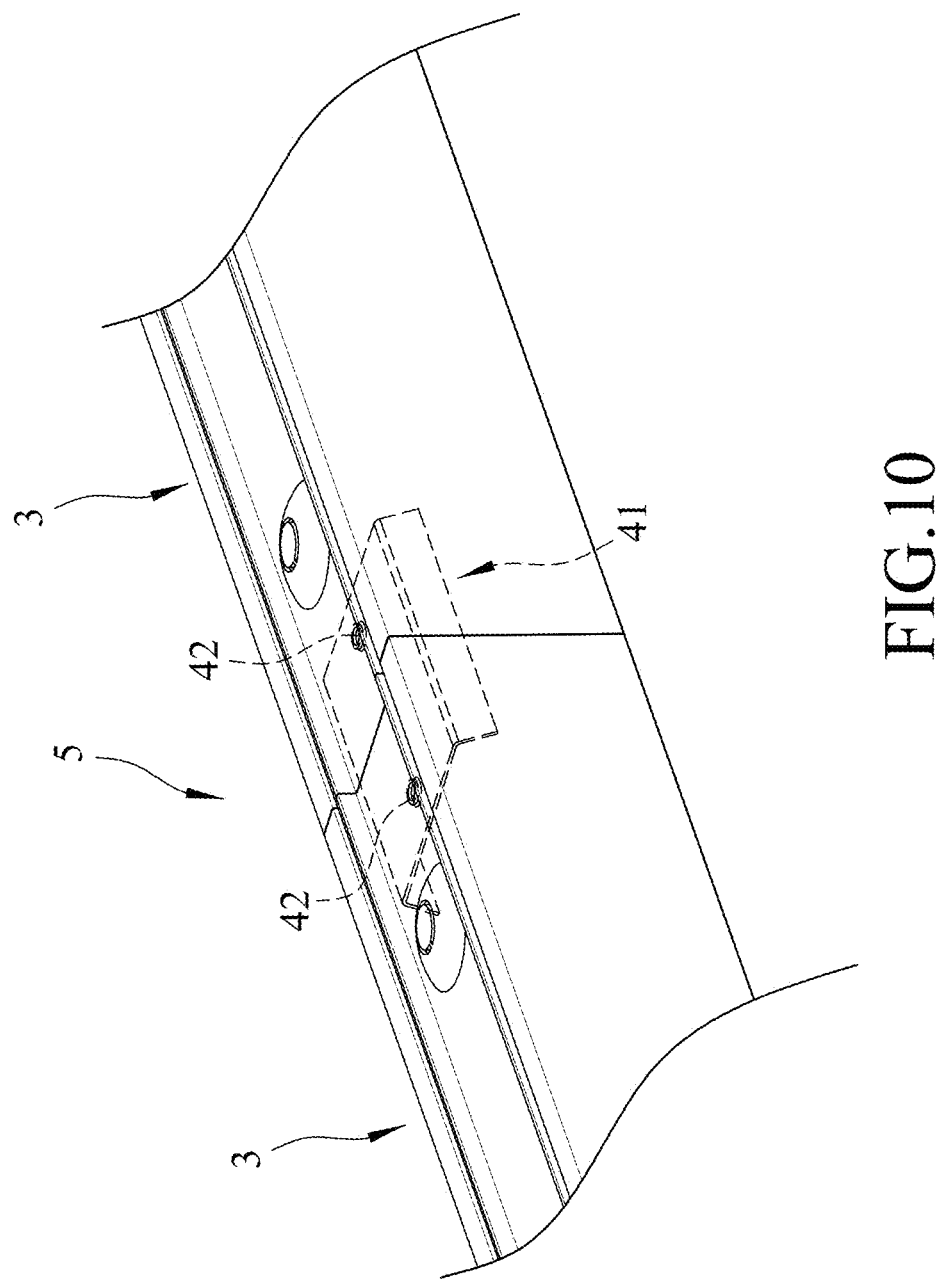
FIG. 10 is a view similar to FIG. 9, but with the frames being assembled.

FIGS. 8 to 10 illustrate a lamp apparatus 5 incorporating a fourth embodiment of the coupling device 2 according to the disclosure. The lamp apparatus 5 further includes a plurality of light sources 51 (only one is visible in FIG. 9) disposed in the accommodation spaces 34 of the frames 3. To assemble the lamp apparatus 5, the coupling unit 4 is first coupled to one of the frames 3, as shown in FIG. 9, and then coupled to the other one of the frames 3. At this time, the resilient member 41 is disposed in the accommodation spaces 34 of the two frames 3, as shown in FIG. 10, and the adjusting members 42 are operated to cause the resilient member 41 to deform and subsequently couple the frames 3. The length of the lamp apparatus 5 may be extendable/lengthened according to requirements by virtue of the aforesaid coupling method/structure. The structure of the lamp apparatus 5 is simple so that it is suitable for modular production, can be easily assembled and disassembled, and can be easily replaced or repaired.

In sum, the coupling unit 4 couples two adjacent frames 3 through a simple and streamlined structure, which does not take up much space, is suitable for different types of frames 3, and is highly versatile. Therefore, the purpose of the disclosure is served.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A coupling device comprising:
  a plurality of frames, each of which includes a base wall and two spaced-apart side walls that cooperate with said base wall to define an accommodation space, said frames being arranged such that said accommodation spaces of said frames communicate with each other; and at least one coupling unit disposed in said accommodation spaces of two adjacent ones of said frames and applying a force to said side walls of the two adjacent ones of said frames so as to couple together the two adjacent ones of said frames;

wherein the force applied by said at least one coupling unit to said side walls of the two adjacent ones of said frames is outward; and wherein said at least one coupling unit includes a resilient member disposed in said accommodation spaces of the two adjacent ones of said frames, said resilient member having a main body portion and two spaced-apart engaging portions extending obliquely and oppositely from said main body portion, said engaging portions respectively applying outward forces to said side walls of the two adjacent ones of said frames in response to a deformation of said main body portion.

2. The coupling device as claimed in claim 1, wherein said base walls of said frames are flush with one another, and said side walls of said frames are also flush with one another.

3. The coupling device as claimed in claim 1, wherein said at least one coupling unit further includes at least one adjusting member, said at least one adjusting member being operable to deform said main body portion of said resilient member so as to change the distance between said main body portion and said base wall of a corresponding one of said frames.

4. The coupling device as claimed in claim 3, wherein said at least one adjusting member penetrates through said base wall of the corresponding one of said frames and abuts against said main body portion of said resilient member, and wherein said main body portion is deformable relative to said base wall in response to the operation of said at least one adjusting member.

5. The coupling device as claimed in claim 4, wherein said at least one adjusting member is a screw, said base wall of the corresponding one of said frames being formed with a screw hole for threaded engagement with said screw, said screw having one end that penetrates through said base wall of the corresponding one of said frames and that abuts against said main body portion of said resilient member, and wherein a part of said main body portion of said resilient member is deformable and moves away from said base wall of the corresponding one of said frames in response to the linear movement of said screw relative to said base wall.

6. The coupling device as claimed in claim 3, wherein said at least one adjusting member threadedly passes through said main body portion of said resilient member and abuts against said base wall of the corresponding one of said frames, and wherein said main body portion is deformable relative to said base wall in response to the operation of said at least one adjusting member.

7. The coupling device as claimed in claim 6, wherein said at least one adjusting member is a screw, said main body portion of said resilient member being formed with a screw hole for threaded engagement with said screw, said screw having one end that penetrates through said main body portion and that abuts against said base wall of the corresponding one of said frames, and wherein a part of said main body portion of said resilient member is deformable and moves away from said base wall of the corresponding one of said frames in response to the threaded movement of said screw.

8. The coupling device as claimed in claim 3, wherein each of said frames further includes a partition wall that is disposed in said accommodation space, that is spaced apart from said base wall, and wherein said base wall, said partition wall and said side walls cooperate to define a region, said at least one coupling unit being disposed in said regions of the two adjacent ones of said frames.

9. The coupling device as claimed in claim 8, wherein each of said side walls has a limiting portion formed obliquely in said region to form an angle between said limiting portion and said base wall and abutting against a corresponding one of said engaging portions of said resilient member.

10. The coupling device as claimed in claim 8, wherein said at least one adjusting member penetrates through said partition wall of a corresponding one of said frames and abuts against said main body portion of said resilient member, and wherein said main body portion is deformable relative to said partition wall of the corresponding one of said frames in response to the operation of said at least one adjusting member.

11. The coupling device as claimed in claim 10, wherein said at least one adjusting member is a screw, said partition wall being formed with a screw hole for threaded engagement with said screw, said screw having one end that penetrates through said partition wall and that abuts against said main body portion of said resilient member, and wherein a part of said main body portion of said resilient member is deformable and moving away from said partition wall in response to the linear movement of said screw relative to said partition wall.

12. The coupling device as claimed in claim 1, wherein each of said frames further includes two limiting portions respectively provided on said side walls within said accommodation space, said engaging portions of said at least one coupling unit respectively abutting against said limiting portions of each of said frames.

13. The coupling device as claimed in claim 12, wherein each of said limiting portions has a first fixed segment disposed on a corresponding one of said side walls, and a second fixed segment disposed on the corresponding one of said side walls and inclined to said first fixed segment, said first and second fixed segments forming an angle therebetween.

14. A lamp apparatus comprising:
a coupling device as claimed in claim 1; and
at least one light source disposed in said accommodation spaces of said frames.

* * * * *